United States Patent [19]
Baker et al.

[11] Patent Number: 5,600,786
[45] Date of Patent: Feb. 4, 1997

[54] FIFO FAIL-SAFE BUS

[75] Inventors: Stephen M. Baker, Roseville; Randall L. Dodson, New Hope; Mark E. Wright, Minneapolis, all of Minn.

[73] Assignee: Honeywell Inc., Minneapolis, Minn.

[21] Appl. No.: 517,668

[22] Filed: Aug. 22, 1995

Related U.S. Application Data

[63] Continuation of Ser. No. 99,790, Jul. 30, 1993, abandoned.

[51] Int. Cl.[6] .............................. G05B 9/02; G06F 7/02; H03M 13/00
[52] U.S. Cl. .............................. 395/182.09; 371/68.1; 364/184; 364/944.61; 364/268.9
[58] Field of Search ..................... 371/67.1, 68.1, 371/68.2; 364/268.9, 943.9, 944.61, 946.1, 184, 187; 395/700, 575, 200.1, 182.08, 182.09

[56] References Cited

U.S. PATENT DOCUMENTS

| | | | |
|---|---|---|---|
| 4,366,350 | 12/1982 | Lee et al. | 179/175.2 C |
| 4,785,453 | 11/1988 | Chandran et al. | 371/68 |
| 4,823,256 | 4/1989 | Bishop et al. | 364/200 |
| 4,980,857 | 12/1990 | Walter et al. | 364/900 |
| 4,996,687 | 2/1991 | Hess et al. | 371/10.1 |
| 5,060,144 | 3/1991 | Sipple et al. | 364/200 |
| 5,243,607 | 9/1993 | Masson et al. | 371/68.1 |
| 5,317,726 | 5/1994 | Horst | 395/575 |
| 5,349,654 | 9/1994 | Bond et al. | 395/575 |

*Primary Examiner*—Larry D. Donaghue
*Assistant Examiner*—Mark H. Rinehart
*Attorney, Agent, or Firm*—Robert A. Pajak; Charles J. Ungemach

[57] ABSTRACT

The invention is an apparatus which utilizes relatively few conductors to provide fail-safe communication between multiple electrical subsystems and a redundant pair of data processors. This is accomplished by including two first-in, first-out memory units within each electrical subsystem, and utilizing these memory units to send the output data from the electrical subsystems on a pair of parallel data buses to a redundant pair of data processors, which then perform error tests on the data to ensure its integrity.

11 Claims, 1 Drawing Sheet

FIFO FAIL-SAFE BUS

This application is a continuation of application Ser. No. 08/099,790, filed Jul. 30, 1993, now abandoned.

BACKGROUND OF THE INVENTION

Field of the Invention: This invention relates to redundant electrical systems. More specifically, it involves a fail-safe method for transferring information from multiple electrical subsystems to a redundant pair of data processors.

DESCRIPTION OF THE PRIOR ART

Fail-safe and fault tolerant systems are frequently desired for aircraft control systems and other systems in which error identification is critical. As is well known in the art, a fail-safe system is one in which a fault causes the system to shut down rather than continuing to function incorrectly, whereas a fault tolerant system is one which has sufficient redundancy to remain functional even if a fault causes one part of the system to shut down. Fail-safe systems are generally used when fault tolerance is unnecessary, because a fail-safe system requires fewer components and is therefore less expensive.

One design practice in aircraft control systems is to partition a system into fault containment areas. A fault containment area is usually a set of redundant subsystems, such as a set of gyroscope or accelerometer data subsystems or a set of redundant data processors. The individual subsystems within a fault containment area are referred to as fault containment modules. One object in partitioning a system into fault containment areas is to ensure that any fault which occurs affects only one fault containment area.

Often, the fault containment areas employed in an aircraft control system exchange data signals with each other. For example, a set of gyroscope fault containment modules will generally send their output to a set of data processors, which perform calculations using the received data. Thus the gyroscope fault containment area and the data processor fault containment area must communicate, via a serial or a parallel data bus or buses.

To ensure at least fail-safe operation for the system as a whole, the bus system by which the fault containment modules exchange data should also be fail-safe. This necessarily involves employing at least two independent data buses, so that a comparison may be made between the data signals received on the data buses. If there is any discrepancy between the data received on one data bus and the data received on another data bus, this indicates a fault in one of the data buses and the system can be shut down in accordance with standard fail-safe practice.

The comparison between data received on separate data buses is typically performed by the same data processors which perform calculations using the received data. To ensure fail-safe operation in the performance of the data comparison, a fail-safe communication means similar to a .fail-safe bus system should be utilized for communication between the data processors.

A common arrangement in aircraft control systems is to have two or more fault containment areas, for example gyroscope or accelerometer fault containment areas, each on its own circuit card assembly, sending data to a third fault containment area, such as a data processor fault containment area. To ensure that a fault in one of the data buses affects only one fault containment area, each fault containment area should send its data via a separate fail-safe set of data buses.

One method for interfacing multiple fault containment areas with a data processor fault containment area is to include a separate serial data bus between each individual fault containment module and each data processor. Because this method employs serial data buses, it does not require many conductors. However, a parallel-serial interface chip is then required at both ends of every serial data bus, so that for N fault containment modules, at least 4 * N parallel-serial interface chips are needed (two data buses per fault containment module, and two interface chips per data bus). Because these interface chips are expensive, this is not the most cost-effective interface method.

Another method to achieve the desired object is to utilize parallel data buses, which have a greater number of conductors than serial data buses. To minimize the total number of conductors required, a separate data bus is not used to send data from each fault containment module to each data processor. Rather, all of the fault containment modules in each fault containment area are connected to two, or sometimes more, data buses. Thus, for two fault containment areas to send data to a data processor fault containment area with two data processors, at least four data buses would be required.

The use of parallel data buses eliminates the need for parallel-serial interface chips, but to prevent interference between signals from different fault containment modules on the same data bus, each fault containment module must send its data signals within a unique time window. Therefore, memory devices are required within each fault containment module to store the module's output data until the proper time for sending that data to a data processor.

The memory devices employed for this purpose may be addressable memories, for example dual-port RAMs, which have one port for a fault containment module to write in the data and one port for a data processor to read out the data. To carry data from a dual-port RAM, a data bus needs 8–16 data lines, approximately ten address lines, and three control lines. When multiplied by the number of data buses in the system, this is an undesirably large number of conductors to fit on a master interconnect board. Therefore, a data bus system employing memory devices which require fewer bus conductors is desirable.

SUMMARY OF THE INVENTION

The invention is an apparatus which utilizes relatively few conductors to provide fail-safe communication between multiple fault containment modules and a redundant pair of data processors. This is accomplished by including two first-in, first-out memory units within each fault containment module, and utilizing these memory units to send the output data on a parallel data bus from each fault containment module to a redundant pair of data processors, which then perform error tests on the data to ensure its integrity.

DESCRIPTION OF THE PREFERRED EMBODIMENT

Figure 1:
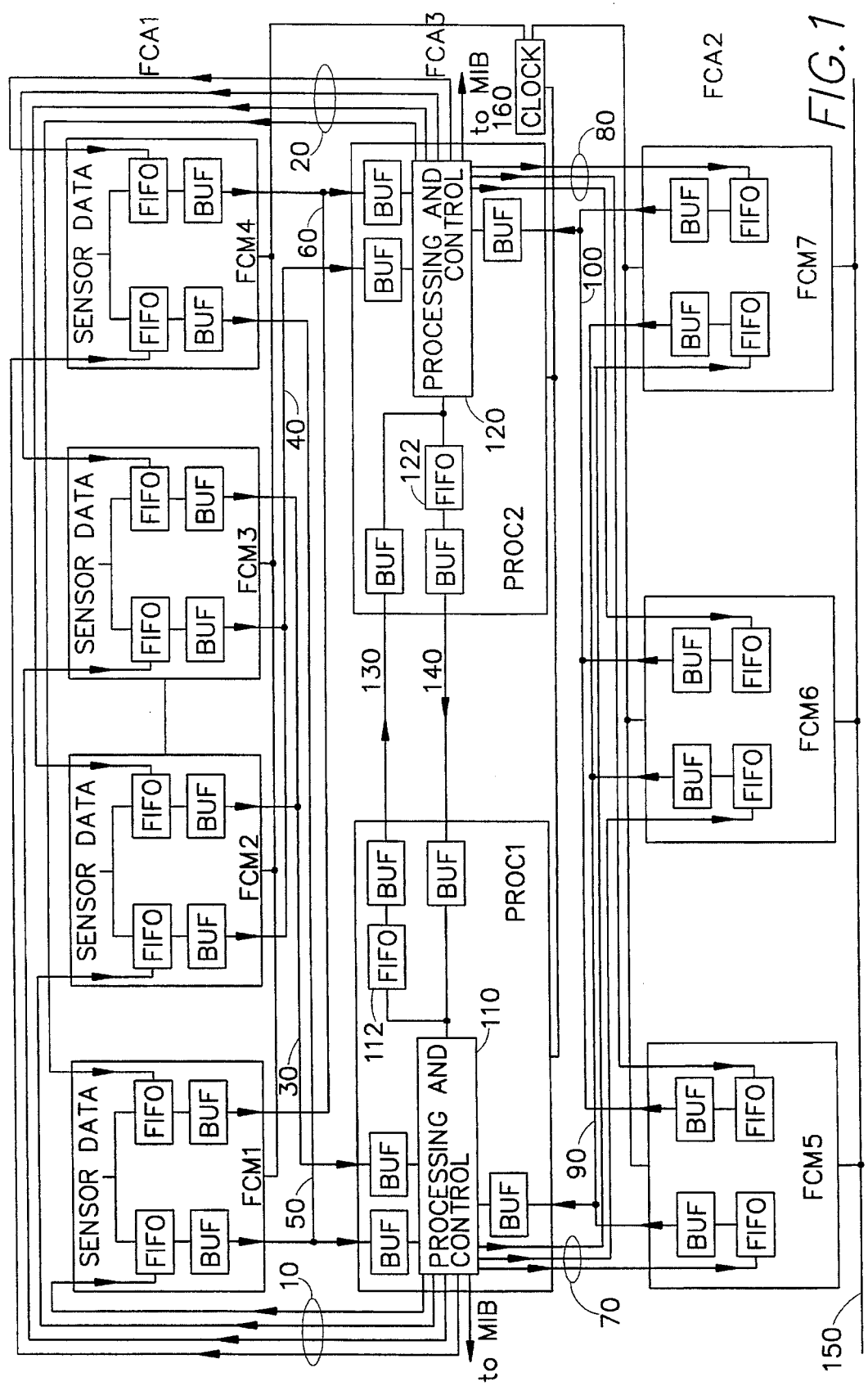
FIG. 1 is a block diagram of a redundant, fail-safe data bus system in accordance with the invention.

FIG. 1 shows a system utilizing a fail-safe bus as described herein. Three fault containment areas FCA1–3 are connected to a master interconnect board (MIB), not shown.

A sensor fault containment area FCA1, such as a gyroscope or accelerometer data fault containment area, includes a plurality of fault containment modules FCM1–4. These fault containment modules pass sensor data to two data processors PROC1 and PROC2 in another fault containment area FCA3 via unidirectional, 8-bit data buses 30, 40, 50, 60. In the preferred embodiment, there are two data buses from fault containment area FCA1 to each data processor for reasons of convenience in arranging the conductors in data buses 30, 40, 50, 60 within FCA1 and on the master interconnect board. An alternative arrangement would be to have only one data bus, connected to all fault containment modules FCM1–4, from FCA1 to each data processor. This alternative arrangement would give substantially the same result.

Similarly, a data receive fault containment area FCA2, such as an ARINC 629 data receive fault containment area, includes a plurality of fault containment modules FCM5–7. These fault containment modules receive data from a serial data bus 150. The data is then stored in FIFOs, buffered onto data buses 90 and 100, and sent to data processors PROC1 and PROC2.

The fault containment modules FCM1–7 and the data processors PROC1 and PROC2 are synchronized by a common clock 160. The processing and control centers 110 and 120 of data processors PROC1 and PROC2 establish timing rules to define when in the timing frame the fault containment modules FCM1–7 write data into their FIFOs and when the data processors PROC1 and PROC2 read from the FIFOs so that the write sequences are complete before the read sequences begin. The FIFO pair in each fault containment module is read simultaneously. The other details of the timing rules are dependent on the unique characteristics of the fault containment modules FCM1–7.

The data processors PROC1 and PROC2 control the FIFO timing by means of control buses 10, 20, 70, 80. The control bus for each FIFO contains a chip select line which selects a particular FIFO for reading, a data strobe line which causes the selected FIFO to send its stored data, and (optionally) a FIFO reset line which resets a pointer within the FIFO to indicate that all of its data has been read out.

After receiving data from one of the fault containment modules FCM1–7, the data processors PROC1 and PROC2 perform identical user-specified calculations using the received data. The data processors PROC1 and PROC2 store the results of the calculations in their FIFOs 112 and 122, respectively. Each data processor then reads the other data processor's results via data buses 130 and 140. The data processors PROC1 and PROC2 each perform a bit-by-bit comparison of the two results. If the results are not exactly the same, the data is not sent on to the master interconnect board. The data processors PROC1 and PROC2 also test the integrity of the data sent by a fault containment module by performing a reasonableness test on the received data. The details of this reasonableness test depend on the unique characteristics of the fault containment modules FCM1–7.

If the data from a subsystem fails either of these tests, the data processors PROC1 and PROC2 will temporarily stop sending the results of their calculations to the master interconnect board and will request transmission of the suspect data. If the data from one fault containment module fails the data processor tests multiple times in succession, the data processors will henceforth ignore the data from that fault containment module.

Because multiple fault containment modules, each with its own independent power supply, use the same data buses, it is desirable to ensure that the data buses will function even if one or more of the fault containment modules lose power. For this reason, the bus drivers and receivers at the ends of the data buses 30, 40, 50, 60, 90, 100 are made with BiCMOS technology, which is well-known in the art. The output stage of each driver and the input stage of each receiver therefore remain in a high impedance state when powered down, so that the other drivers and receivers on the same data bus are not short circuited to ground due to power failure in one subsystem. This enables the other drivers to function normally even when power has been lost to one or more fault containment modules.

The invention improves upon the prior art by reducing the number of conductors required by the data buses. Each of the data buses in the invention includes eight or nine conductors, while each control bus includes two or three conductors. There is no need for the ten address lines used in dual-port RAM systems. This smaller number of conductors reduces power consumption and allows more convenient arrangement of the conductors on the master interconnect board.

We claim:

1. A data processing system architecture comprising:

a plurality of data processors, each operative for deriving respective processor output data as a function of respective input data presented thereto;

a plurality of data bus means, where each one of said plurality of data bus means is coupled to only one of said plurality of data processors and each one of plurality of data processors is coupled to only one of said plurality of data bus means, each of said plurality of data bus means operative for presenting said respective input data to respective ones of said plurality of data processors;

a plurality of subsystems in which each subsystem is connected to each of the data processors, each subsystem including a set of memory device means, each one of said plurality of subsystems responsive to at least one selected input quantity, and operative for storing in each of said set of memory device means, associated with the same one of said plurality of subsystems, the same subsystem output data as a function of said at least one selected input quantity associated with the same one of said plurality of subsystems; and means for coupling each one of said plurality of data bus means to one of said set of memory device means of each of said subsystems, and in which each memory device means of each subsystem is coupled to only one of said plurality of data bus means, thereby permitting presenting said subsystem output data as processor means input data.

2. The data processing system architecture of claim 1 further comprising:

a plurality of processor interface data bus means;

each of said plurality of data processing means further including, a processor memory device means for storing respective processor output data, and at least one data receiver means operative for receiving interface data; and wherein (i) said processor memory device means of each of said plurality of data processor means is coupled to only one of said plurality of processor interface bus means not coupled to any other processor memory device means, and (ii) each of said processor interface bus means is coupled to a separate one of said least one data receiver means of each of said plurality data processor means excluding that one of said plurality of data processor means in which said processor interface bus means is coupled to its associated processor memory device means.

3. The apparatus of claim 2 wherein each of said plurality of data processor means further includes comparison means for comparing said processor output data stored in said memory device means and said interface data received by said at least one data receiver means, associated with the same one of said plurality of data processor means, and providing an output indicative of an existence or absence of said comparison.

4. The apparatus of claim 1 wherein said plurality of data processor means consists of only two data processor means.

5. The apparatus of claim 1 wherein each of said memory device means is a first-in, first-out memory unit for storing data.

6. The apparatus of claim 2 wherein each of said memory device means is a first-in, first-out memory unit for storing data.

7. The apparatus of claim 1 wherein the number of memory device means for each set of memory device means for each subsystem and the number of data bus means is equal to the number of said data processor means.

8. The apparatus of claim 2 wherein the number of memory device means for each set of memory device means for each subsystem and the number of said data bus means is equal to the number of said data processor means.

9. A fail safe data processing system architecture comprising:

first and second data processors, each operative for deriving respective processor output data as a function of respective input data presented thereto;

a plurality of subsystems in which each subsystem is connected to each of the data processors, each one of said plurality of subsystems including first and second memory device means, said plurality of subsystems each responsive to at least one selected input quantity, each one of said plurality of subsystems operative for storing the same subsystem output data, as a function of said selected input quantity, in each of said first and second memory device means associated with the same one of said plurality of subsystems;

first and second data bus means, where said first data bus means is coupled to said first data processor for presenting input data thereto, and said second data bus means is coupled to said second data processor for presenting input data thereto;

means for coupling said first data bus means to said first memory device means of each of said plurality of subsystems for permitting transferring of said subsystem output data of each of said plurality of subsystems as first data processor means input data; and means for coupling said second data bus means to said second memory device means of each of said plurality of subsystems for permitting transferring of said subsystem output data of each of said plurality of subsystems as second data processor means input data.

10. The fail safe data processing system architecture of claim 9 further comprising:

first and second processor interface data bus means;

each of said first and second data processing means further including,
a processor memory device means for storing respective processor output data, and
a data receiver means operative for receiving interface data; and wherein (i) said processor memory device means of said first data processor means and said data receiver means of said second data processor means is coupled to said first processor interface bus, and (ii) said processor memory device means of said second data processor means and said data receiver means of said first data processor means is coupled to said second processor interface bus.

11. The apparatus of claim 10 wherein said first data processor means includes comparison means for comparing said processor output data stored in said memory device means of said first data processor means and said interface data received by said data receiver means of said first data processor means, and providing an output indicative of an existence or absence of said comparison, and said second data processor means includes comparison means for comparing said processor output data stored in said memory device means of said second data processor means and said interface data received by said data receiver means of said second data processor means, and providing an output indicative of an existence or absence of said comparison.

* * * * *